United States Patent [19]

Jang

[11] Patent Number: 5,579,373
[45] Date of Patent: Nov. 26, 1996

[54] TRANSMISSION POWER CONTROL METHOD IN CELLULAR RADIOTELEPHONE SYSTEM

[75] Inventor: Bu-Kwan Jang, Taegu, Rep. of Korea

[73] Assignee: SamSung Electronics Co., Ltd., Kyungki-do, Rep. of Korea

[21] Appl. No.: 147,288

[22] Filed: Nov. 5, 1993

[30] Foreign Application Priority Data

Nov. 5, 1992 [KR] Rep. of Korea ................. 1992-20709

[51] Int. Cl.$^6$ ................................................. H04M 11/00
[52] U.S. Cl. ................................. 379/59; 379/58; 379/60; 455/33.1; 455/33.2
[58] Field of Search ................................. 379/58, 59, 60, 379/63; 455/33.1, 33.2, 54.1, 56.1, 69

[56] References Cited

U.S. PATENT DOCUMENTS

| | | | |
|---|---|---|---|
| 4,435,840 | 3/1984 | Kojima et al. | 455/33 |
| 4,613,990 | 9/1986 | Halpern | 455/33 |
| 4,670,899 | 6/1987 | Brody et al. | 379/60 |
| 4,914,615 | 4/1990 | Lusignan | 455/33 |
| 4,941,200 | 7/1990 | Leslie et al. | 455/33 |
| 5,003,619 | 3/1991 | Morris et al. | 455/69 |
| 5,134,709 | 7/1992 | Bi et al. | 455/33.1 |
| 5,203,008 | 4/1993 | Yasuda et al. | 455/33.1 |
| 5,220,678 | 6/1993 | Feei | 455/69 |
| 5,243,598 | 9/1993 | Lee | 455/33.1 |

OTHER PUBLICATIONS

James F. Whitehead, "Cellular System Design: An Emerging Engineering Dicipline", IEEE Com. Mag., Feb. 1986, vol. 29, No. 2.

Douglas A. Kerr, "The Cellular Telephone System", Conti. Eng. Ed. Program 1986 & 1994.

*Primary Examiner*—Edward L. Coles, Sr.
*Assistant Examiner*—Thomas L. Stoll
*Attorney, Agent, or Firm*—Robert E. Bushnell, Esq.

[57] ABSTRACT

A transmission power control method in a cellular radiotelephone system that includes, within at least one cell site, first and second stations, each having a transmitter and a receiver for a predetermined radio channel, and dynamically adjusts transmission power levels, comprising the steps of forming location groups by dividing radio channels within the cell site around the first station into a plurality of groups which are from lowest group to highest group, measuring, in the first station, levels of signals received from the second station, allotting the second station to a location group corresponding to the measured signal level, assigning an idle traffic channel to the second station by checking traffic channels according to a location group of the second station, determining a normal operation state in case of being within a level range, a power decrease requiring state in case of being over a maximum value of level range, and a power increase requiring state in case of being below a minimum value of level range, by comparing a signal level received from the first station and measured in the second station with the level range received and determined in the first station, decreasing a transmission power of the second station by the determination of the power decrease requiring state to allot the second station to a lower location group and checking traffic channels according to the location group to decrease a transmission power of the first station when there is no idle channel, and increasing a transmission power of the second station by the determination of the power increase requiring state to allot the second station to a higher location group and checking traffic channels according to the location group to increase a transmission power of the first station when there is no idle channel.

20 Claims, 12 Drawing Sheets

| L_REG | DATA BASE OF CHANNEL NUMBERS AND CHANNEL STATES | | | | | MEMORY SIZE |
|---|---|---|---|---|---|---|
| 1(Z1) | CH 1 | CH 2 | CH 3 | CH 4 | CH 5 | 2 BYTE X 5 |
| 2(Z2) | CH 6 | CH 7 | CH 8 | CH 9 | CH10 | 2 BYTE X 5 |
| 3(Z3) | CH11 | CH12 | CH13 | CH14 | CH15 | 2 BYTE X 5 |
| 4(Z4) | CH16 | CH17 | CH18 | CH19 | CH20 | 2 BYTE X 5 |
| 5(Z5) | CH21 | CH22 | CH23 | CH24 | CH25 | 2 BYTE X 5 |
| 6(Z6) | CH26 | CH27 | CH28 | CH29 | CH30 | 2 BYTE X 5 |
| 7(Z7) | CH31 | CH32 | CH33 | CH34 | CH35 | 2 BYTE X 5 |
| 8(Z8) | CH36 | CH37 | CH38 | CH39 | CH40 | 2 BYTE X 5 |

| Field | Byte |
|---|---|
| VMAC | 1 |
| CMAC | 1 |
| MAX_MAC | 1 |
| MIN_MAC | 1 |
| INCR | 1 |
| DECR | 1 |
| AVE_RSS | 1 |
| SUM_RSS | 4 |
| AVE_BER | 1 |
| SUM_BER | 4 |
| MAX_RSS | 1 |
| MIN_RSS | 1 |
| MAX_BER | 1 |
| MIN_BER | 1 |
| FLAG | 1 |
| CH NO | 2X40 |
| L_REG | 1 |
| VAL | 1 |

*FIG. 12A*

TRANSMISSION POWER CONTROL METHOD IN CELLULAR RADIOTELEPHONE SYSTEM

BACKGROUND OF THE INVENTION

The present invention relates to a cellular radiotelephone system including at least one mobile communication station, and particularly to a transmission power control method for dynamically adjusting transmission power of a base station and a mobile station in a digital cellular radiotelephone system as well as in an analog system.

Generally, it has long been considered that, in a radiotelephone system with at least one mobile station in a communicating pair of stations, it is advantageous to provide for adjustment of transmission power. The stations will then use only the lowest reliable power level and thereby reduce the likelihood of interference among co-channel stations engaged in different calls.

One example of station power control in a cellular radiotelephone system is the *Radiotelephone Transmission Power Control* contained in U.S. Pat. No. 4,613,990 to Samuel W. Halpern, which teaches a method with a base station dynamically controlling transmission power levels of a base station and a mobile station in an analog cellular radiotelephone system. The dynamic transmission power control method is performed as follows. Initially, if a call is attempted then the base station is required to assign a voice channel to accommodate the call; to do this, the base station searches for an idle channel within its network. If an idle channel is found, the idle channel is allotted to the mobile station. Next, a received signal strength indicator (RSSI) of the base station according to the transmission of the mobile station is periodically measured. The measured RSSIs are averaged within a predetermined time and the averaged value is compared with predetermined maximum and minimum threshold amplitudes to check whether the average value is within a desired range. If the averaged RSSI is smaller than a minimum threshold amplitude, a power increasing message is sent to the mobile station, which then increases its transmission power. At this time, if the mobile station is already transmitting at its maximum power, the mobile station is handed-off during the subscriber's radiotelephone conversation unto an adjacent base station. If however, the averaged RSSI is larger than a maximum threshold amplitude because the mobile station is transmitting at an unnecessarily strong power, a power decreasing message is sent to the mobile station to decrease its transmission power. At this time, if the mobile station is already transmitting at its minimum power, its current state of transmission power is maintained and the subscriber's radiotelephone call is processed.

The base station also adjusts the amplitude of its transmission power by RSSI measurement at the mobile station according to the transmission of the base station. In Halpern '990, the power adjustment is made according to an average of determined threshold amplitude levels, and the transmission of power is adjusted to be at this average. I have observed however, that a problem exists because if the threshold amplitude levels are changed, the average also changes and, after a predetermined number of adjustments, no further increase or decrease in adjustment of transmission power can be made; this consequently results in hand-off of the subscriber's radiotelephone call to another cell site. The *Method And Apparatus For Adjusting The Power Of A Transmitter* described by Loh J. Feei in U.S. Pat. No. 5,220,678, contemplates a simplistic alternative transmission power adjustment in which one subscriber transmits a decreasing radio frequency power signal starting at a maximum amplitude level. A second subscriber monitors that signal and, when the amplitude of the radio frequency drops to a minimum level required for reliable communication, the monitoring subscriber transmits an acknowledgement.

The *Microcell System In Digital Cellular* by Wm. C. Lee, U.S. Pat. No. 5,243,598, assigns different sets of transmission frequency channels to a plurality of contiguous cells of a cellular telephone system to arrange for hand-off control in order to maintain continuous communication with mobile radiotelephones moving between cells. Multiple access is achieved with assignment of at least one of the frequencies in the assigned set of transmission frequencies to more than one mobile radiotelephone, with either frequency division multiple access, time division multiple access, or code division multiple access.

The *Cellular Mobile Telephone System And Method* of U.S. Pat. No. 4,829,554 to Barnes et al. provides a cellular telephone system and method in which channel assignments and radiotelephone call routing are controlled by a central control station and each communication channel is separately controlled at a cell station site. Barnes '554 uses signal strength in determining whether to hand-off a call from one cell site to an adjacent cell cite. It seems to me however, that Barnes et al. '554 has a problem because there is no adjustment of transmission power from either the cell site or the mobile unit based on received signal strength to prevent either an unnecessary hand-off to another cell site or to prevent the termination of a call if the strength between the mobile unit and the cell receiving the hand-off is not sufficient to establish communication.

Meanwhile, in the analog cellular radiotelephone system, one radio frequency channel serves one mobile station, but in a digital cellular radiotelephone system having a time division multiple access (TDMA) method, one physical radio frequency channel is divided into time slots corresponding to a plurality of mobile stations and serves all of those mobile stations at the same time. Accordingly, when a plurality of mobile stations sharing a radio frequency channel are at different distances from the base station, in the conventional transmission power control method, transmission power control for those mobile stations should be performed according to time slots.

The *Multiples Information Transmission System* of U.S. Pat. No. 4,726,020 to Fino et al. discusses multiplexing techniques in response to the detection of free and engaged channels. Many technical problems are encountered in practice of these techniques in an endeavor to adjust transmission power, that are in part attributable to both each and every time slot having several millisecond units of duration, and to the fast response speed that would be required of hardware used to implement these techniques.

Moreover, when a cell plan of a base station is developed based on these foregoing conventional transmission power control techniques, a coverage radius of a radio frequency channel of a base station should be calculated using its maximum transmission power. Accordingly, a frequency allocation efficiency in the base station is as follows. For example, in a twelve-pattern cluster having twenty-six radio frequency channels per base station in an analog cellular radiotelephone system with eighteen decibel carrier/interference (C/I), the frequency reuse distance is as follows:

$$D=6R \text{ (when } K=12) \qquad (1)$$

In equation (1),

K indicates a frequency reuse pattern that is the number of cells which do not reuse channels, R is a RF coverage radius, and D is a frequency reuse distance, i.e., a distance between cells that can reuse the same frequency.

Here, when the frequency reuse value K is varied, the above equation can be expressed as follows:

$$D=3.46R \text{ (when } K=4) \tag{2}$$

$$D=4.6R \text{ (when } K=7) \tag{3}$$

$$D=7.55R \text{ (when } K=19) \tag{4}$$

As shown in equations (1) through (4), there is a limit to frequency reuse according to frequency reuse pattern.

As described above, the conventional transmission power control method has difficulty in controlling transmission power in each time slot in a TDMA cellular radiotelephone system. Also, the frequency allocation efficiency is lowered due to the limit in frequency reuse.

SUMMARY OF THE INVENTION

Accordingly, it is an object of the present invention to provide an improved transmission power control process and circuit.

It is another object to provide a transmission power control process and circuit that adjusts transmission power in the unit of a channel.

It is yet another object to provide a transmission power control process and circuit that adjusts transmission power in the unit of a channel even in a time division multiple access type cellular radiotelephone system.

It is still another object to provide a transmission power control circuit and process that improves frequency allocation efficiency by reducing the frequency reuse distance.

These and other objects may be achieved in accordance with the principles of the present invention with a circuit and process for dynamically adjusting transmission power of base stations and mobile stations in both analog and digital cellular radiotelephone systems. These principles contemplate forming location groups by dividing radio channels within the cell site around a first station into a plurality of groups which are from a lowest group to a highest group, measuring, at the first station, amplitude levels of signals received from a second station, allotting the second station to a location group corresponding to the measured signal amplitude level, assigning an idle traffic channel to the second station by checking traffic channels according to a location group of the second station; determining a normal operational state where the amplitude levels of the received signals are within a level range, a state of requiring a decrease in amplitude of transmission power where the amplitude level of the received signal is over a maximum value of the level range, and a state of requiring an increase in amplitude of transmission power where the amplitude level of the received signal is below a minimum value of the level range, by comparing the amplitude level of a signal received from the first station and measured at the second station with the level range received and determined in the first station; decreasing the transmission power of the second station in accordance with the determination of the power decrease requiring state to allot the second station to a lower location group and checking traffic channels corresponding to the lower location group to decrease the transmission power of the first station when there is no idle channel, and increasing a transmission power of the second station by the determination of the power increase requiring state to allot the second station to a higher location group and checking traffic channels corresponding to the higher location group to increase the transmission power of the first station when there is no idle channel.

A call may be released if a call release message is received from the second station after the normal operational state has been determined or if the transmission power has been either decreased or increased.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

The above objects and other advantage of the present invention win become more apparent by describing the preferred embodiment of the present invention with reference to the attached drawings, in which:

FIG. 9 is a detailed flow chart of the processing call supervising block 306 of FIG. 3;

FIGS. 12A and 12B show memory maps configured according to the practice of the present invention.

DETAILED DESCRIPTION OF THE INVENTION

Figure 1:
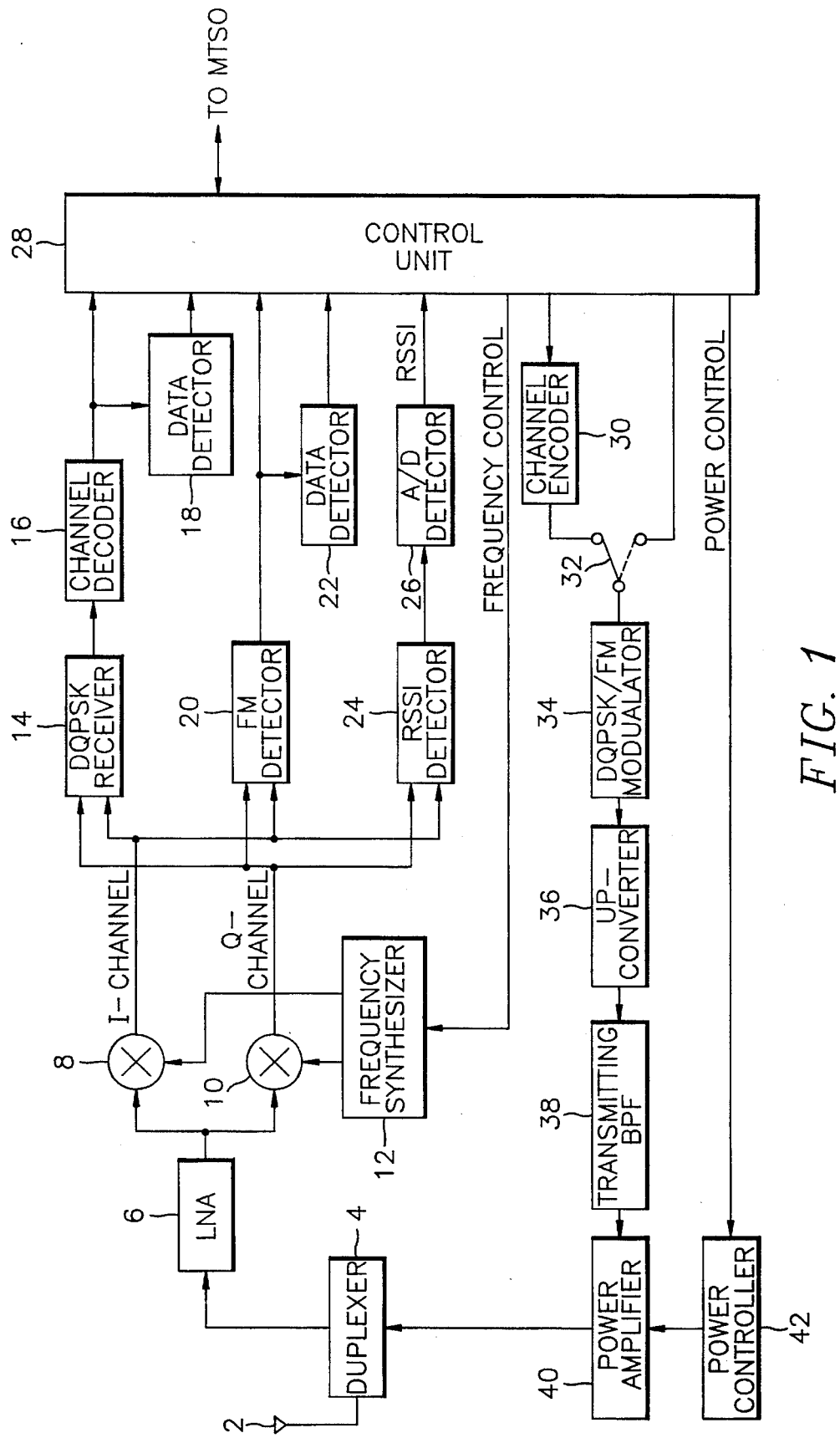
FIG. 1 is a schematic diagram of a radiotelephone transceiver constructed according to the principles described herein for the practice of the present invention.

Turning now to the drawings, FIG. 1 illustrates a schematic diagram of an analog/digital dual-mode radiotelephone transceiver in which the present invention is employed is illustrated. A transceiver of the base station in a cellular system is described as an example. A mobile station also has the same constitution, and the only difference is to have a speaking circuit for a subscriber's call instead of the data communication circuit for transceiving data with a mobile telecommunications switching office (MTSO) through a transmission line. Analog/digital dual-mode radiotelephone transceivers are described in detail in

*Cellular System Dual-Mode Mobile Station-Base Station Compatibility Standard* distributed in Mar. 1991 by U.S. EIA (Electronic Industries Association).

Referring again to FIG. 1, the schematic system and operation provides a good understanding of the present invention and is described as follows. First, the transceiver of FIG. 1 has two operational modes, i.e., an analog mode and a digital mode. In an analog mode, a frequency modulation (FM) communication type which is an analog communication type is used. In a digital mode, a π/4-shifted differential quadrature phase shift keying (DQPSK) communication type which is a digital communication type is used, and at the same time three time slots are provided with respect to an a RF channel by a TDMA type.

Now, assume that the transceiver of FIG. 1 is in inter-communication with a transceiver of a corresponding mobile station by assigning a traffic channel into any one mobile station within its cell site.

First of all, in a transmission to a mobile station, voice the data received in data communication circuit through a transmission line from the MTSO is supplied to a control unit 28 for overall control of the transceiver. Generally, the voice data is PCM coded data. In an analog mode, the voice data supplied to the control unit 28 is PCM-decoded and then is supplied to DQPSK/FM modulator 34 through a switch 32. In a digital mode, the voice data is VSELP(Vector-Sum Excited Linear Predictive)-coded, is channel-encoded in a channel encoder 30, and then is supplied to DQPSK/FM modulator 34 through the switch 32. After data supplied to the DQPSK/FM modulator 34 is FM-modulated in an analog mode and is DQPSK-modulated in a digital mode, it is up-converted into a higher frequency for transmission in an up-converter 36. Then, a transmitting BPF (Band Pass Filter) 38 removes frequency components outside the transmission frequency band, and a power amplifier 40 amplifies the tranceiver's transmission power, and the data is transmitted through a duplexer 4 and an antenna 2.

Secondly, a reception operation from a mobile station is considered. A signal received through the antenna 2 is low-noise-amplified in LNA (Low Noise Amplifier) 6 through the duplexer 4 and then is supplied to two mixers 8 and 10, at the same time. The mixers 8 and 10 mix the receiving signal with a local oscillation frequency generated in a frequency synthesizer 12. The frequency synthesizer 12 generates two local oscillating frequency signals having a frequency corresponding to a currently used channel by frequency control from the control unit 28. There is a 90° phase difference between the two local oscillating frequency signals. Accordingly, an I-phase signal and a Q-phase signal are generated in the mixers 8 and 10 respectively. And then the I-phase and Q-phase signals are supplied to the DQPSK receiver 14, the FM detector 20, and RSSI detector 24, at the same time. In a digital mode, the I-phase and Q-phase signals are DQPSK-demodulated in the DQPSK receiver 14, are channel-decoded according to a time slot in the channel decoder 16, and then are supplied to the control unit 28. In an analog mode, the I-phase and Q-phase signals are FM demodulated in the FM detector 20 and then are supplied to the control unit 28. Then, in an analog mode, the control unit 28 PCM-codes the FM-demodulated vice data and then transmits the PCM-coded voice data to the MTSO. In a digital mode, the control unit 28 VSELP-decodes the channel-decoded voice data, thereby transmitting the channel-decoded voice data to the MTSO. Also, the FM demodulated data and the channel-decoded data are respectively supplied to the corresponding data detectors 18 and 22, so that data for various call control is detected to be supplied to the control unit 28. Accordingly, the control unit 28 performs various call control operations in response to the detected data.

Meanwhile, the RSSI detector 24 detects RSSI from the I-phase and Q-phase signals supplied from the mixers 8 and 10. The detected RSSI is digital converted in the A/D converter 26 and then is supplied to the control unit 28. Accordingly, the control unit 28 measures the magnitude of the RSSI to control the power controller 42 for controlling power amplification of the power amplifier 40, thereby controlling the transmission power.

Figure 2:
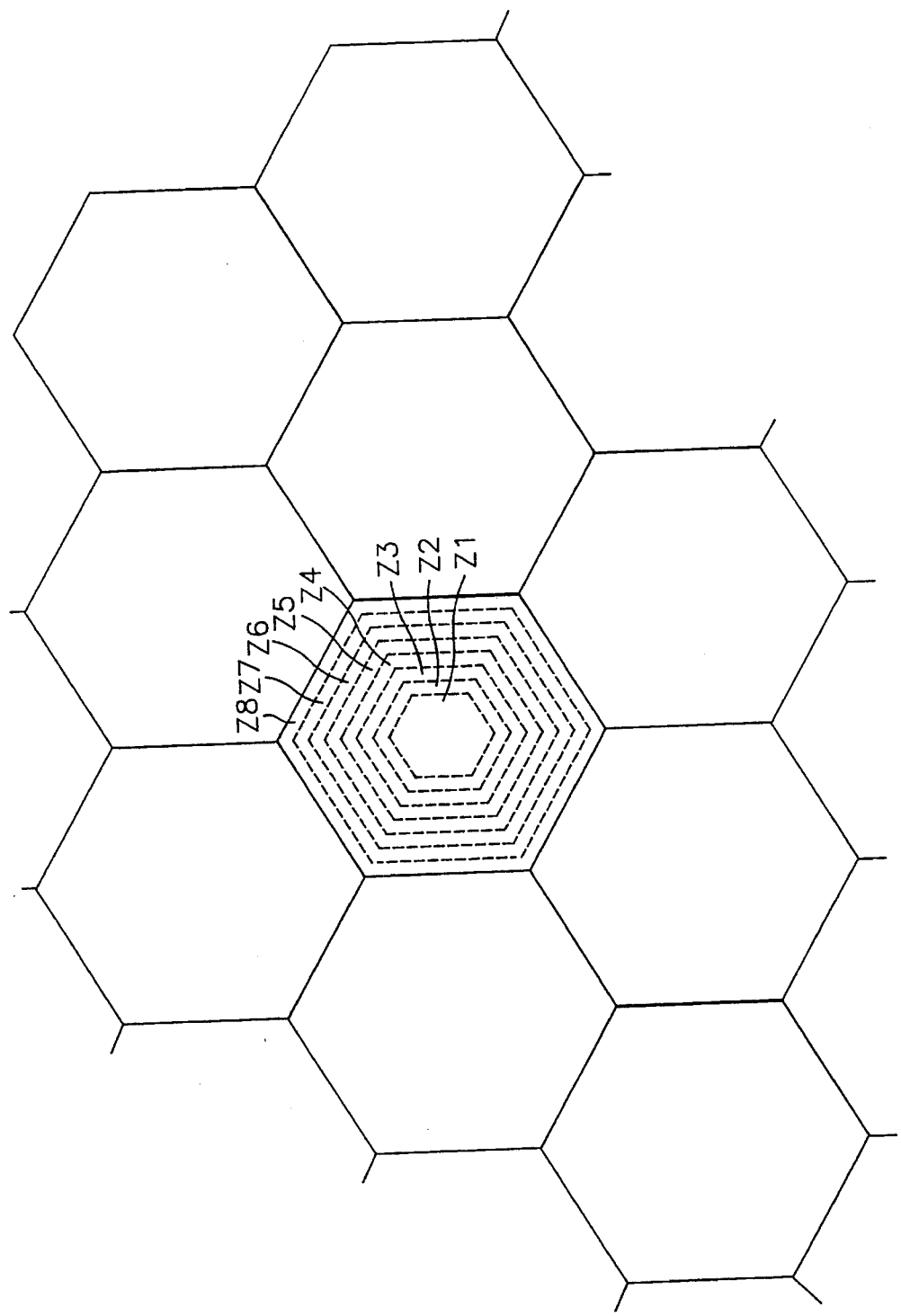
FIG. 2 shows an example illustrating formation of location groups of mobile stations according to the present invention.

FIG. 2 is an example of forming location groups of a mobile station according to the present invention. The location groups are formed by dividing into a plurality of groups the traffic channels around a base station within one cell site according to the predetermined power levels. To put it concretely, each cell cite has 8 location groups and there are 8 location groups Z1–Z8 shown in one of the cell cites in FIG. 2.

Figure 3:
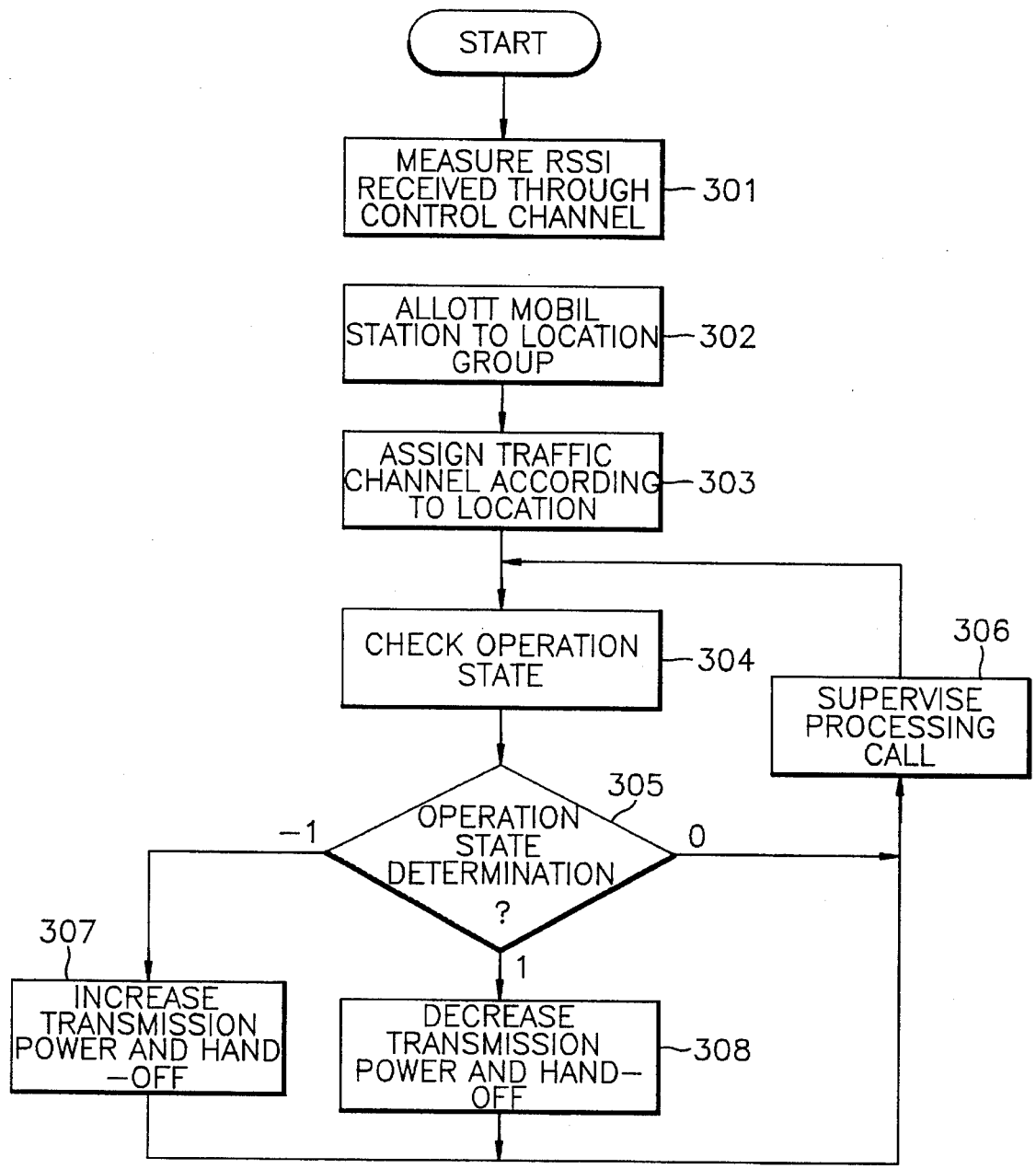
FIG. 3 is a flow chart illustrating a transmission power control function according to the present invention.

FIG. 3 shows a flow chart of the blocks used by the present invention to provide transmission power control. In a signal level measuring block 301, a signal level received from a mobile station is measured at a base station. In a location group allotting block 302, the mobile station is allotted to a location group corresponding to the measured signal level. In a channel assigning block 303, traffic channels according to the allotted location group of the mobile station are detected and the idle traffic channel is assigned to the mobile station. In an operation state checking block 304 and operation state determining block 305, a signal level received from the base station and measured in the mobile station is compared with a level range received and determined in the base station, and the state is determined as a normal operation state in case of being within the level range, as a power decrease requiring state in case of being over a maximum value of the level range, and as a power increase requiring state in case of being below a minimum value of the level range. In power decreasing block 308, a transmission power of the mobile station is decreased by the determination of the power decrease requiring state to allot the mobile station to a lower location group and traffic channels according to the lower location group are checked to decrease a transmission power of the base station when there is no idle channel. In a power increasing block 307, the transmission power of the mobile station is increased by the determination of the power increase requiring state to allot the mobile station to a higher location group and traffic channels according to the higher location group are checked to increase the transmission power of the base station when there is no idle channel. In a processing call supervising block 306, after a normal operation state is determined or the transmission power is decreased or increased, the presence of a call release message from the mobile station is checked. When the call release message is received, a call is released, but when the message is not received, the operation state checking block 304 is again performed.

FIGS. 4 through 11 provide detailed flow charts of the embodiment shown in FIG. 3. Memory maps for performing the present invention are illustrated in FIG. 12, wherein VMA, CMAC, MAX_MAC, . . . VAL refer to corresponding memory locations and the codes or values stored therein.

Hereinafter, the operation of an embodiment of the present invention is described in detail with reference to FIGS. 1 through 12.

First of all, to control transmission power according to the present invention, the channel location group forming task of forming traffic channels into several groups according to transmission output strength should be accomplished preceded prior further to system operation. The location groups are generally formed, within a cell site, as shown in FIG.2, by estimating mobile station distribution within the cell and properly adjusting several transmission output levels of the base station to form several location groups around the base station. These location groups are concentric so as to have the base station as a central location and the location groups surround the base station cell site, wherein the location groups have power levels from a lowest level to a highest level as the location groups extend from the base station. That is, the first location group nearest the base station has the lowest power level and the location group furthest from the base station has the highest power level. The traffic channels assigned within a cell site are allotted to the formed location groups. It is assumed that the transmission output of each location group is set by the following table 1.

TABLE 1

| LOCATION GROUP | TRANSMISSION OUTPUT (dBW) | VMAC |
| --- | --- | --- |
| Z1 | 35 | 111 |
| Z2 | 37 | 110 |
| Z3 | 40 | 101 |
| Z4 | 43 | 100 |
| Z5 | 46 | 011 |
| Z6 | 49 | 010 |
| Z7 | 52 | 001 |
| Z8 | 56 | 000 |

Figures 9, 12B:
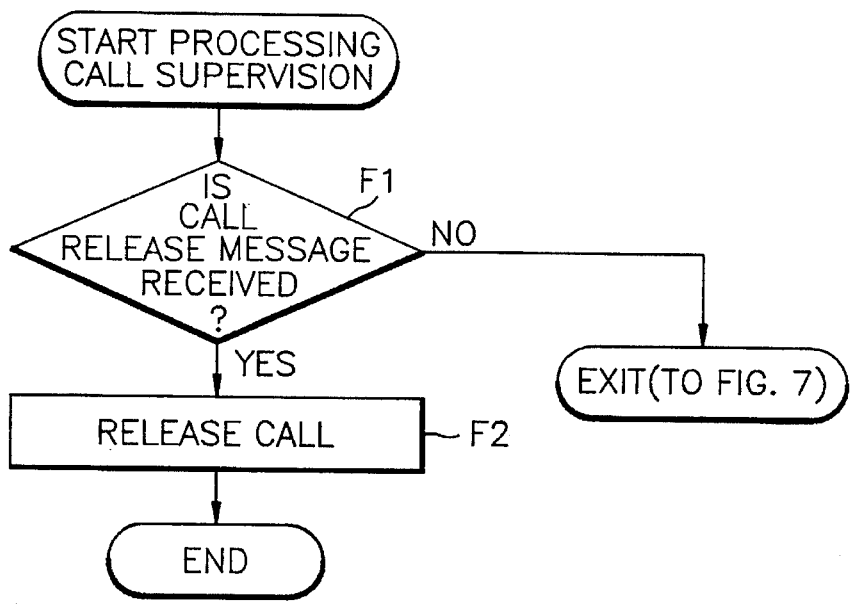

In channel assignment to the mobile station, a location of the mobile station is estimated according to RSSI of a channel assignment requiring signal of the mobile station, and a proper channel is assigned to the location. Then, a cell plan is formed since an overall inter-cell frequency division form is distributed from a low output channel to a high output channel in several levels. Also, as shown in FIG. 12B, a data base of channel numbers and channel states is constituted in the memory of the control unit 28 of FIG. 1. This gives high efficiency in frequency resource reuse since frequency reuse distance is reduced because of short coverage radius with respect to a frequency corresponding to a low output channel in cell planning.

Also, registers for storing preset values, measured values, and flags for performing the present invention are constituted in the memory within the control unit 28, as shown in FIG. 12A.

As described above, if channel location groups are formed, appropriate transmission power control is performed according to a location of the mobile station and an environmental condition during call processing of the mobile station according to the method illustrated by the flow charts shown in FIGS. 4 through 11 corresponding to blocks 301 to 308 of FIG. 3.

Figure 4:
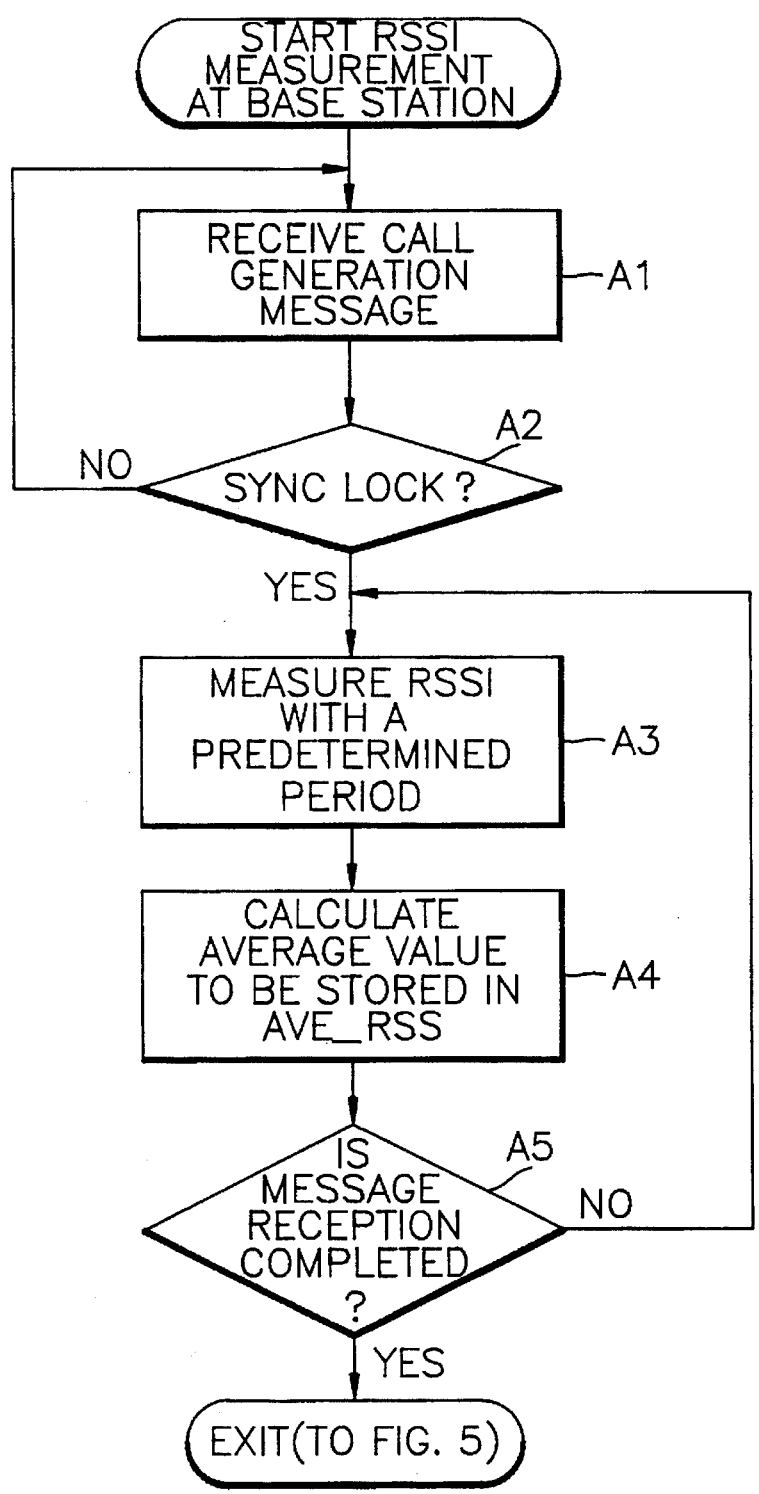
FIG. 4 is a detailed flow chart showing the signal level measuring block 301 of FIG. 3.
Figure 5:
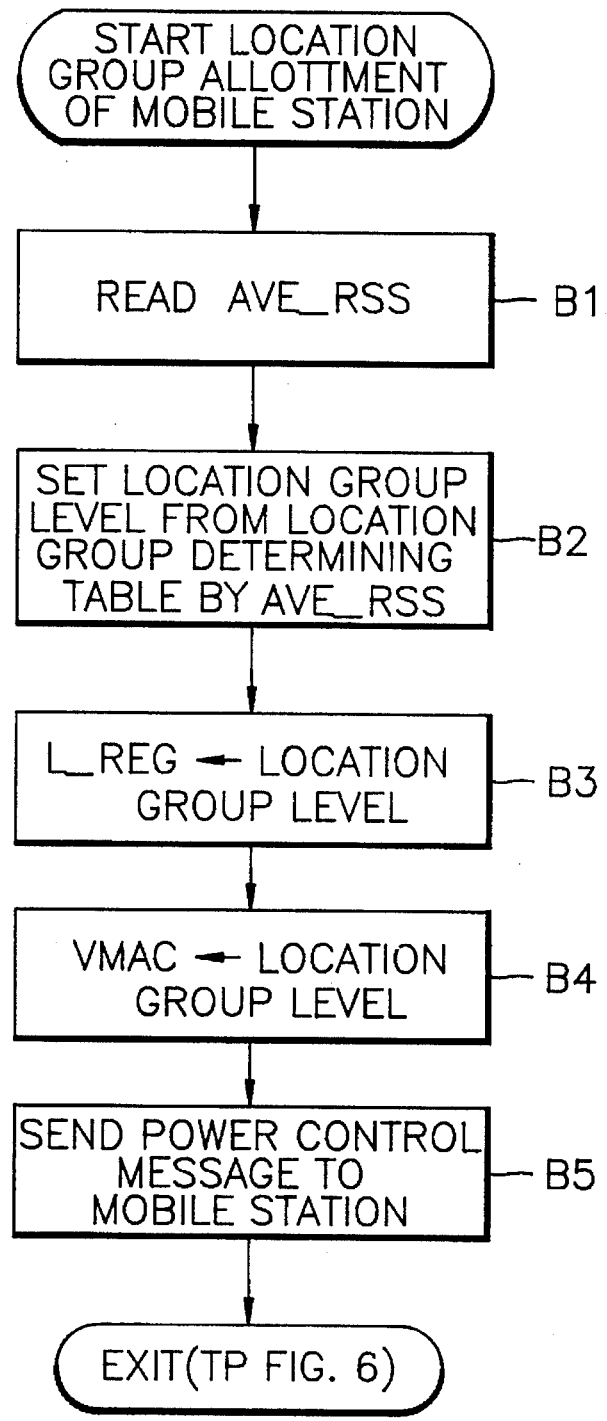
FIG. 5 is a detailed flow chart of the location group allotting block 302 of FIG. 3.

If a call generation message is received through an antenna 2 to generate a call from one mobile station, the control unit 28 measures RSSI received through control channel at block 301 of FIG. 3, i.e., FIG. 4. That is, if sync is locked at blocks A1 and A2, RSSI which is a level of signal reception of from the mobile station during receiving the message is measured through RSSI detector 24 and A/D converter 26 within a predetermined period at block A3 and its average value is calculated to be stored in AVE_RSSI of FIG. 12A at block A4. The measuring period may be, for example, 10 msec. If the reception of a message is completed, a jump to block 302, i.e., FIG. 5, is performed.

At blocks B1 and B2 of FIG. 5, the measured average RSSI is read from AVE_RSSI and, based on this, a location group level is set from the preset location group determining table as shown in the following table 2.

TABLE 2

| RSSI level (dBW) | LOCATION GROUP |
| --- | --- |
| −113—−105 | Z1 |
| −105—−97 | Z2 |
| −97—−90 | Z3 |
| −90—−82 | Z4 |
| −82—−74 | Z5 |
| −74—−66 | Z6 |
| −66—−58 | Z7 |
| −58~ | Z8 |

Figure 6:
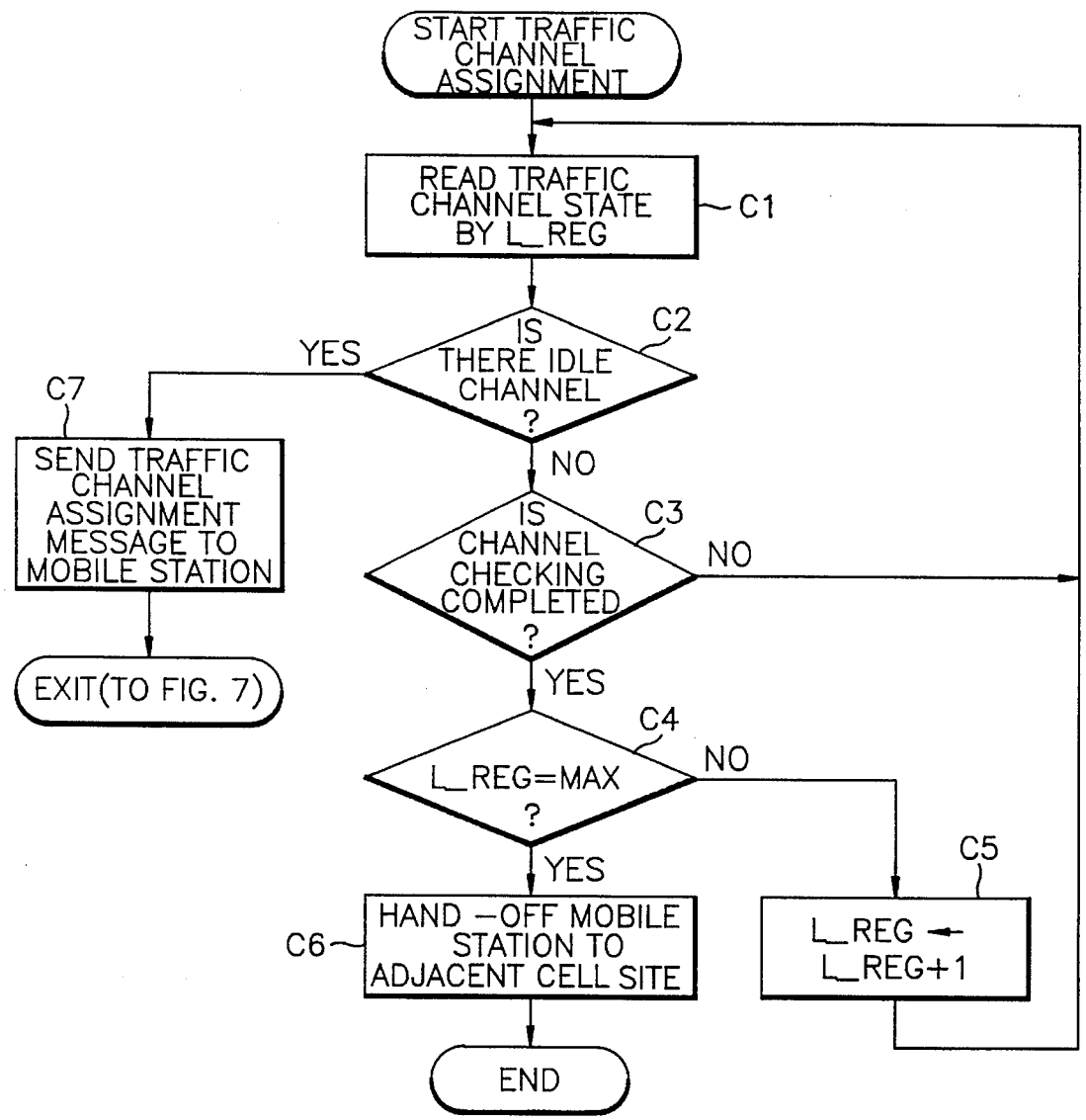
FIG. 6 shows a detailed flow chart of the channel assigning block 303 of FIG. 3.

The determined location group level is stored in L_REG and VMAC at blocks B3 and B4 and then a power control message corresponding to VMAC is sent at block B5, thereby completing a location group allocation of the mobile station. Then, a jump to block 303, i.e., FIG. 6, is performed to assign traffic channel. Accordingly, transmission power of the mobile station is set as in the table 1.

Figure 7:
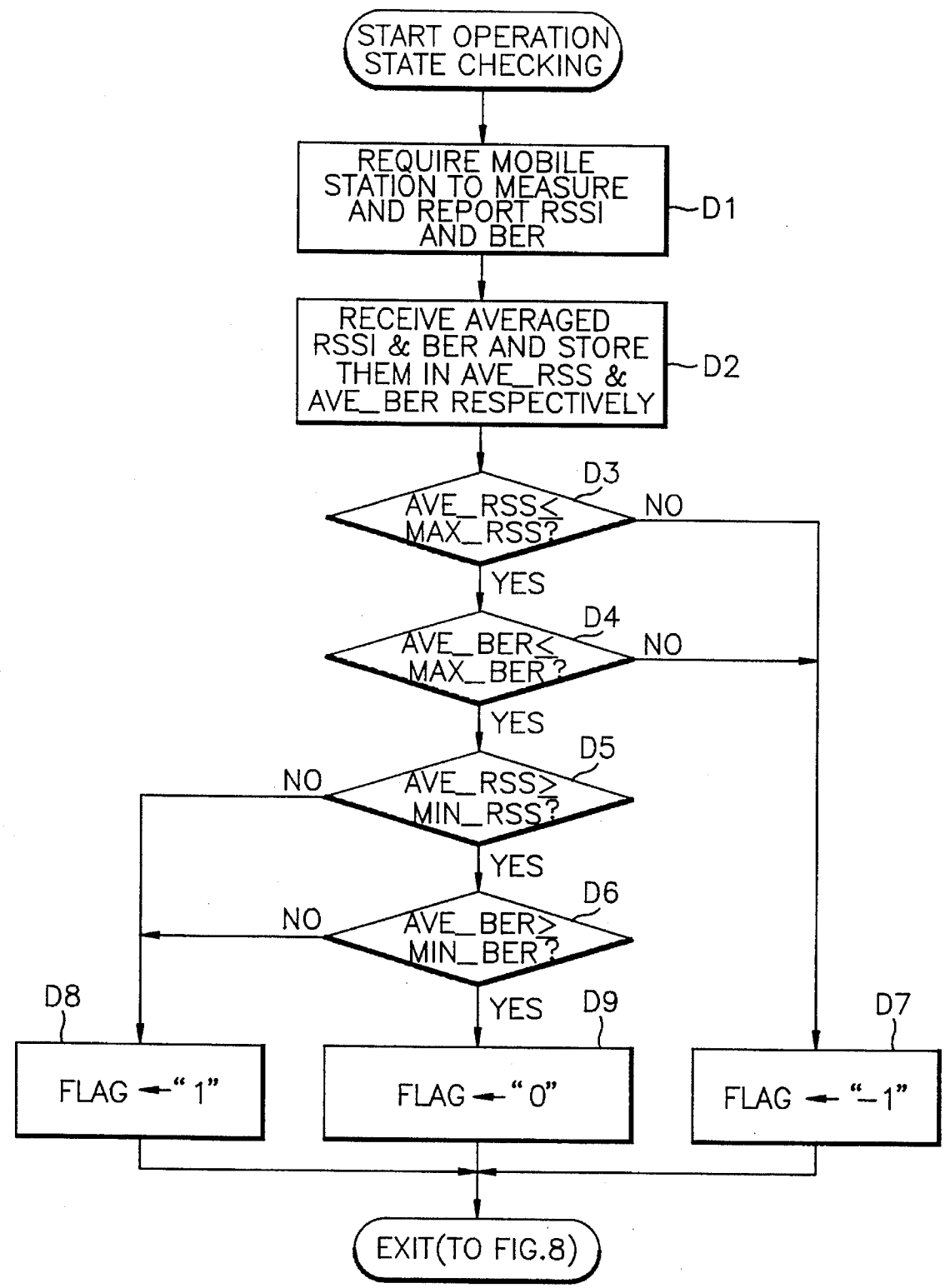
FIG. 7 is a detailed flow chart of the operation state checking block 304 of FIG. 3.

At blocks C1 to C3 of FIG. 6, a state of the traffic channel of the location group allotted in a corresponding mobile station is read from the data base of channel numbers and channel states shown in FIG. 12B with L_REG and the presence of an idle channel is checked. At this time, when an idle channel does not exist, blocks C4 and C5 are processed to check the idle channel in an adjacent location group. When them is an idle channel, a traffic channel assignment message is sent at block C7 to assign the channel, and then block 304, i.e., FIG. 7, is processed to check operation state. At this time, if there is no idle channel within a cell site, the mobile station is call-transferred into an adjacent cell site at block C6, and the process is ended.

At block D1 of FIG. 7, the mobile station is required to measure RSSI and a bit error rate (BER) of the current call processing channel in a call processing state and to periodically and continuously observe and report the state of the channel. When the report is received, the control unit 28 of the base station respectively stores average values of RSSIs and BERs into AVE_RSSI and AVE_BER at block D2 and then performs blocks D3 through D7. At this time, if AVE_RSSI is larger than MAX_RSSI or if AVE_BER is larger than MAX_BER, a FLAG is set to −1 at block D7. If AVE_RSSI is between MIN_RSSI and MAX_RSSI and AVE_BER is between MIN_BER and MAX_BER, the FLAG is initiated as "On" at block D9. If AVE_RSSI is smaller than MIN_RSSI or if AVE_BER is smaller than MIN_BER, the FLAG is set to 1 at block D8. Then, a jump to block 305, i.e., FIG. 8, is performed to determine the operation state according to the FLAG.

Figure 8:
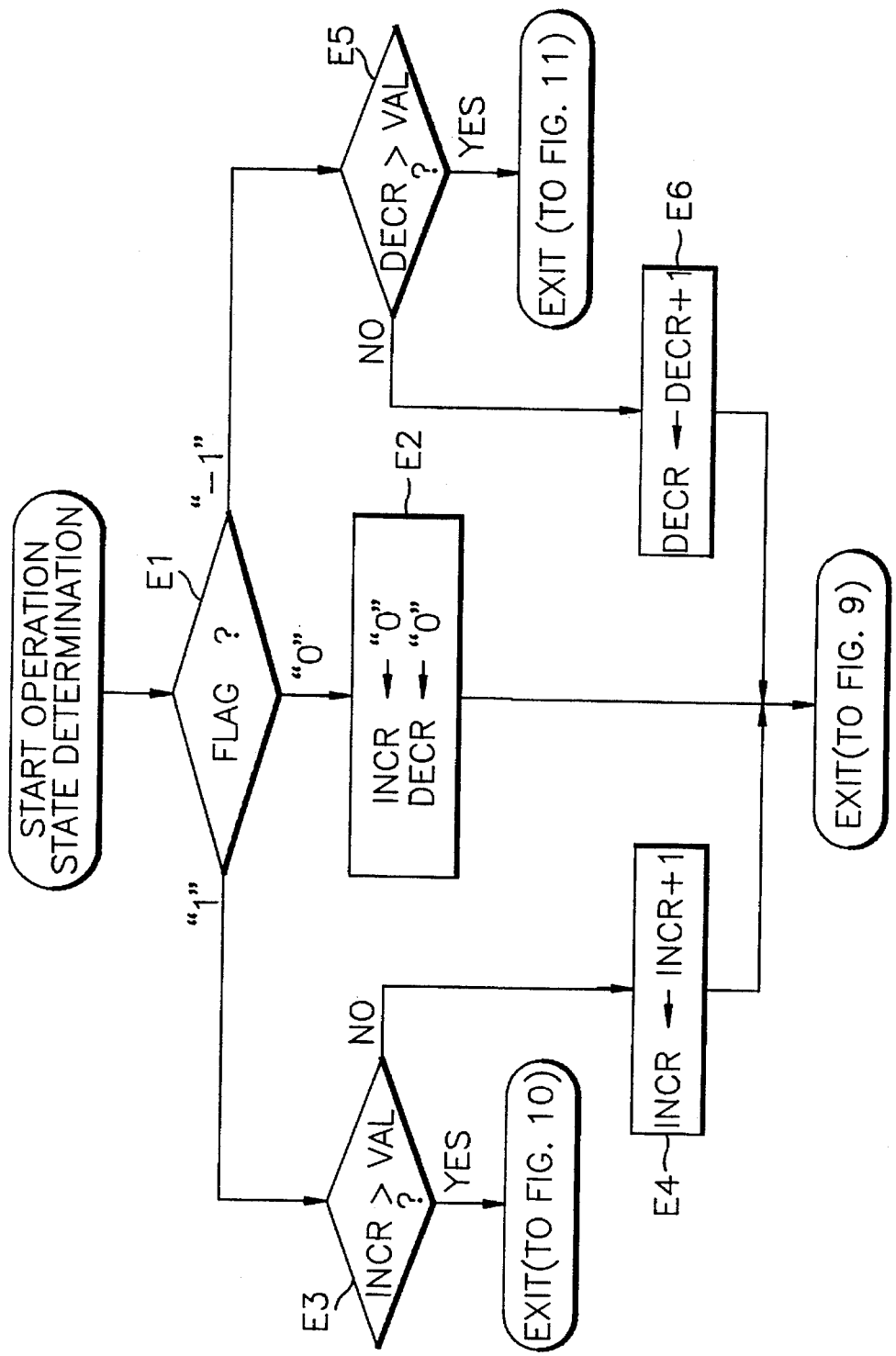
FIG. 8 is a detailed flow chart of the operation state determining block 305 of FIG. 3.
Figure 10:
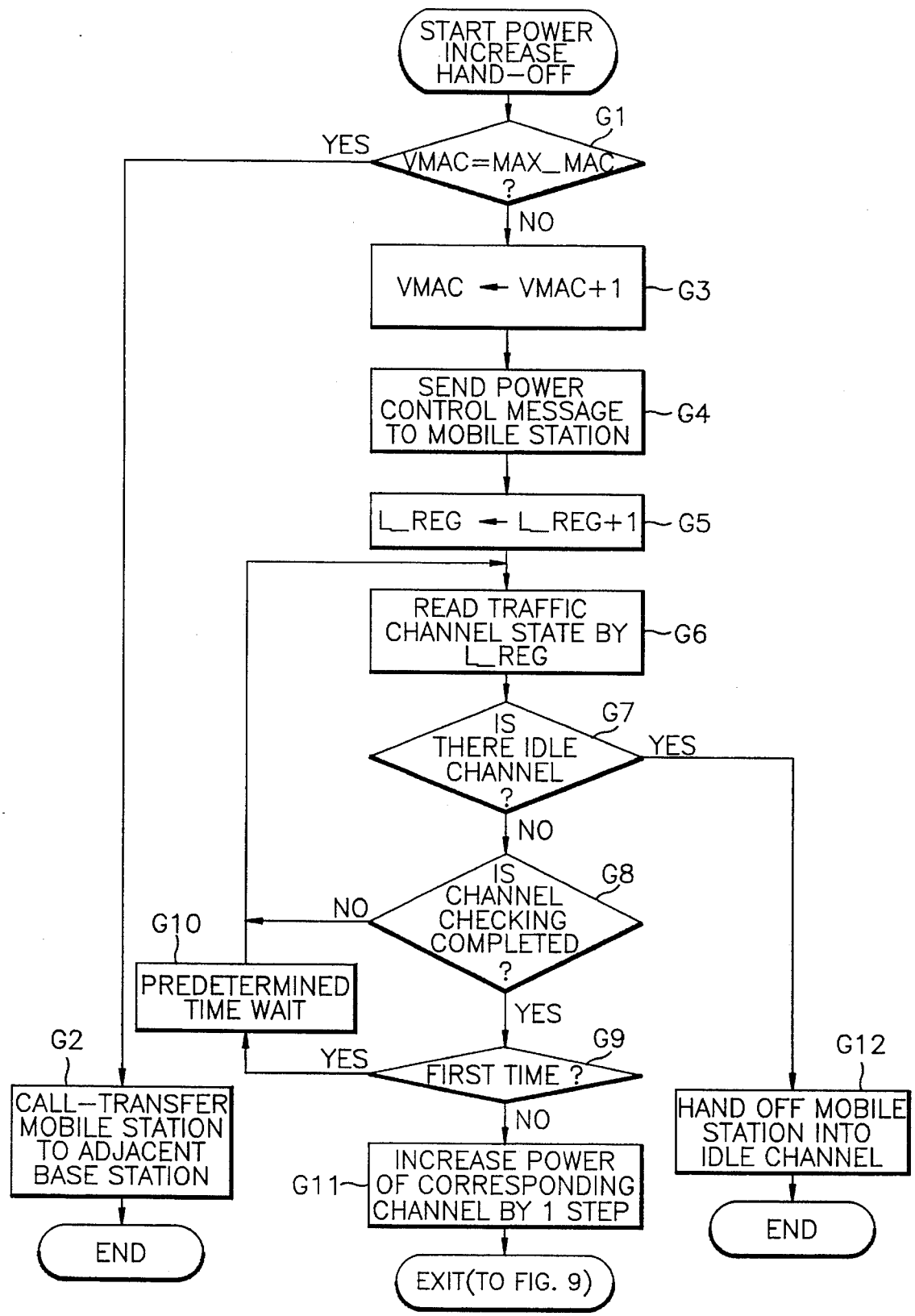
In FIG. 10, a detailed flow chart of the power increasing block 307 of FIG. 3.
Figure 11:
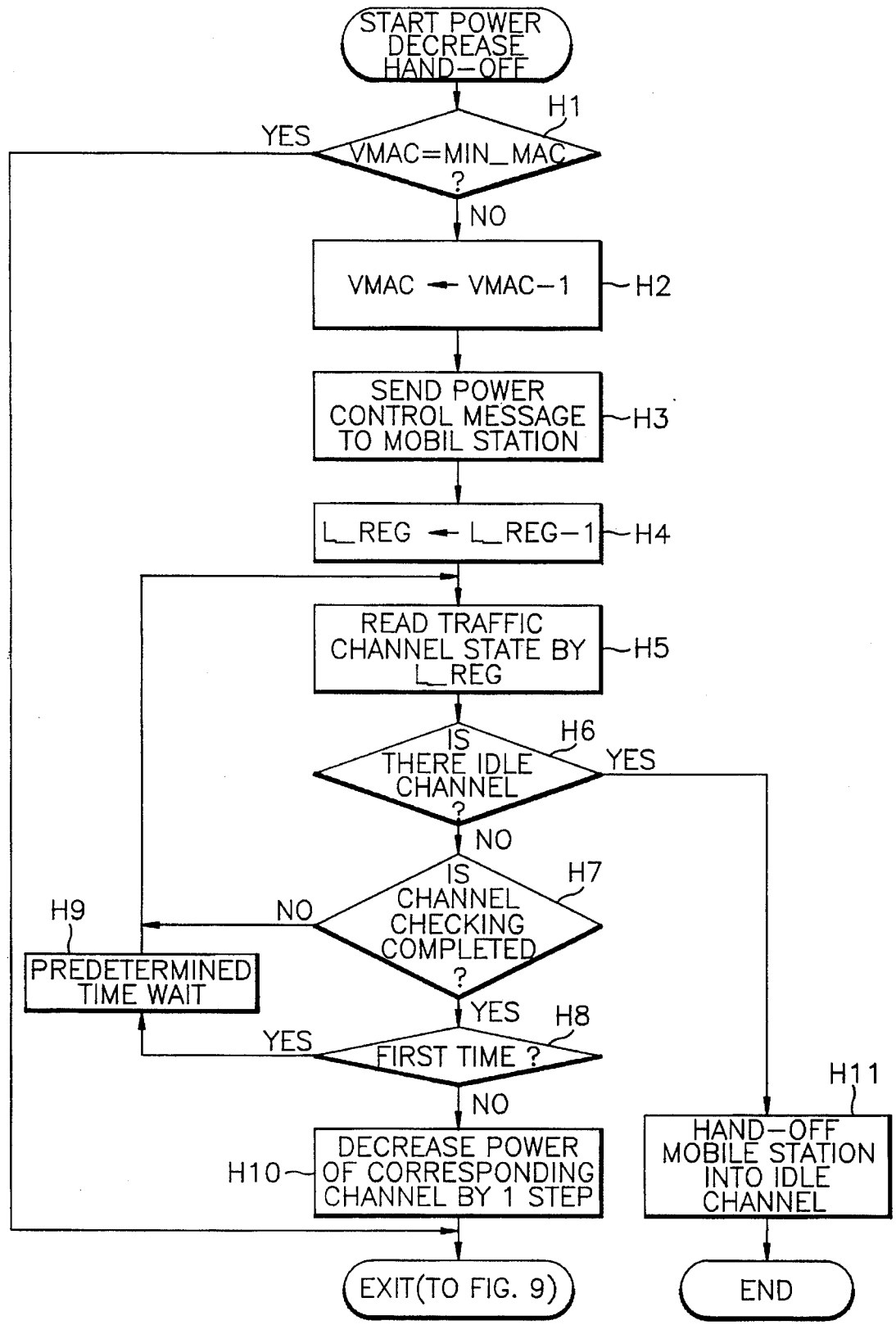
FIG. 11 is a detailed flow chart of power decreasing block 308 of FIG. 3.

At block E1 of FIG. 8, the set FLAG is checked. At this time, if FLAG is in an initial state which is "0", INCR and DECR are reset at block E2 for normal operation, and a jump to block 306, i.e., FIG. 9, is performed. If the set FLAG is "1", it is checked that INCR exceeds VAL at block E3, i.e., that "1" is repeated over a predetermined number of times. If the predetermined number is not reached, INCR is increased by 1 at block E4 and a jump into FIG.9 is performed. If the predetermined number is exceeded, a jump into block 307, i.e., FIG. 10, is performed. If the set FLAG is "−1", it is checked at block E5 that DECR exceeds VAL, i.e., that "−1" is repeated over a predetermined number of times. If the predetermined number is not reached, DECR is increased by 1 at block E6 and a jump into FIG.9 is performed. If the predetermined number is exceeded, a jump into block 308, i.e., FIG. 11, is performed.

Accordingly, as shown in FIGS. 7 and 8, a signal level received from the base station and measured in the mobile station is compared with a level range received and determined in the base station. In case of being within the level range, a normal operation state is determined. In case of being over a maximum value in the level range, a power decrease requiring state is determined, and in case of being below a minimum value in the level range, a power increase requiring state is determined.

At block F1 of FIG. 9, the presence of receiving a call release message from the mobile station is checked. When a call release message has been received, the call is released at block F2 and the process is ended. When the call release message has not been received, the location group data of the current mobile station is kept as it is, and block 304, i.e., FIG. 7, is performed to continuously and periodically check RSSI and BER by a report of the mobile station.

At block G1 of FIG. 10, it is checked that VMAC becomes MAX_MAC. At this time, if VMAC has become MAX_MAC, the mobile station is call transferred to an adjacent base station at block G2 and the process is ended. Because, when a location group of a mobile station having a poor call quality is the highest group, there is no next-higher location group. Accordingly, call transfer to an adjacent base station is performed. When VMAC has not been increased to MAX_MAC, VMAC is increased by 1 at block G3, and a power control message is sent to the mobile station at block G4, thereby increasing the transmission power by 1 block. L_REG is increased by 1 at block G5, thereby correcting the location data of the mobile station to allot the corresponding mobile station to a higher location group. At blocks G6 to G10, it is checked that an idle channel exists within the allotted location group. If there is an idle channel, the corresponding mobile station is handed off during conversation into the idle channel at block G12. At this time, if there is no idle channel, a predetermined time wait is performed and then channel checking is again performed. As a result of re-checking, if there is an idle channel, hand-off into the idle channel is performed at block G12, and if there is no idle channel, the transmission power of the corresponding channel of the base station is increased by 1 block at block G11 and then a jump to block 304, i.e., FIG. 9, is performed to continuously repeat the processing call supervision. The increased transmission power of the corresponding channel is returned to the original transmission power after the corresponding mobile station ends the call or leaves the corresponding channel.

Also, at block H1 of FIG. 11, it is checked that VMAC is MIN_MAC. If VMAC is MIN_MAC, the location data cannot be corrected and accordingly a jump into FIG. 9 is performed since a next lower location group does not exist when the location group of the mobile station having a poor traffic quality is the lowest group. If VMAC is not MIN_MAC, then at blocks H2 to H4, VMAC is decreased by 1 to send a power control message to the mobile station, thereby decreasing the transmission power by 1 block, and L_REG is decreased by 1 to correct mobile station location data, thereby allotting the corresponding mobile station to a lower location group. It is checked at block H5 that an idle channel exists within the allotted location group. If there is an idle channel, the corresponding mobile station is handed off, at block H11, during conversation into the idle channel. If there is no idle channel, a predetermined time wait is performed, and then the channel checking is again performed. As a result of re-checking, if there exists an idle channel, hand-off is performed at block H11. If there is no idle channel, a transmission power of a corresponding channel in the base station is decreased by 1 block at block H10 and then a jump into block 304, i.e., FIG. 9, is performed to continuously repeat the processing call supervision. The decreased transmission power of the corresponding channel is returned to the original transmission power after the call of corresponding mobile station is ended or the corresponding channel is left.

As described above, the present invention is a method of controlling a transmission power by forming traffic channels into a plurality of location groups according to the predetermined power levels around base station within one cell site. The method can adjust a transmission power in the unit of channel even in a digital cellular radiotelephone system, and can improve frequency allocation efficiency by reducing frequency reuse distance.

What is claimed is:

1. A transmission power control method in a cellular radiotelephone system comprising, within at least one cell site, first and second stations, each having a transmitter and a receiver for a predetermined radio channel, and dynamically adjusting transmission power levels, comprising the steps of:

forming location groups by dividing radio channels within the cell site around said first station into a plurality of groups arranged from a lowest group to a highest group;

measuring, in said first station, a signal level of a signal received from said second station;

allotting said second station to one of said location groups corresponding to said measured signal level;

assigning an idle traffic channel to said second station by checking traffic channels according to an allotted location group of said second station;

determining an operational state of the second station, a normal operation state being determined as said operational state in a case of the received signal level being within a level range, a power decrease requiring state being determined as said operational state in a case of the received signal level being over a maximum value of the level range, and a power increase requiting state being determined as said operational state in a case of the received signal level being below a minimum value of the level range, by comparing the received signal level of the signal received from said first station and measured in said second station with the level range, the level range being received and determined in said first station;

decreasing a transmission power of said second station in response to the determination of said power decrease requiring state to allot said second station to a lower location group and checking traffic channels according to the lower location group to decrease a transmission power of said second station when there is no idle channel; and increasing a transmission power of said second station in response to the determination of said power increase requiring state to allot said second station to a higher location group and checking traffic channels according to the higher location group to increase a transmission power of said second station when there is no idle channel.

2. A transmission power control method in a cellular radiotelephone system as claimed in claim 1, wherein the transmission power decreasing step and the transmission power increasing step respectively further comprise the step of handing off during conversation said second station into an idle channel when there exists the idle channel during the step of checking traffic channels according to the allotted location group.

3. A transmission power control method in a cellular radiotelephone system as claimed in claim 1, wherein said power increasing step further comprises the step of handing off during conversation said second station into an adjacent base station when a current location group of said second station is already the highest location group.

4. A transmission power control method in a cellular radiotelephone system as claimed in claim 1, further comprising the step of releasing a call if a call release message is received from said second station after said normal operation state is determined or said transmission power is decreased or increased.

5. A transmission power control method in a cellular radiotelephone system as claimed in claim 2, the operation state determining step comprises the steps of:

sending, in said first station, a message of requiring said second station to measure and report a received signal strength indicator and a bit error rate;

going to the power decreasing step if it is repeated over a predetermined number of times that an averaged received signal strength indicator received from said second station is larger than a maximum received signal strength indicator threshold in a corresponding location group or if an averaged bit error rate is larger than a maximum bit error rate;

going to the call releasing step if said averaged received signal strength indicator is between a minimum received signal strength indicator threshold and said maximum received signal strength indicator threshold in said corresponding location group, and said averaged bit error rate is between a minimum bit error rate and said maximum bit error rate; and going to the power increasing step if it is repeated over a predetermined number of times that said averaged received signal strength indicator is smaller than said minimum received signal strength indicator threshold in said corresponding location group, or that said averaged bit error rate is smaller than said minimum bit error rate.

6. A transmission power control method in a cellular radiotelephone system that includes, within one cell site, a base station and at least one mobile station, each having a transmitter and a receiver for a predetermined radio channel, and dynamically adjusts transmission power levels, comprising the steps of:

forming location groups according to a different transmission power level respectively set for each of said location groups by dividing traffic channels within the cell site around said base station into a plurality of groups which are arranged from the lowest group closest to said base station having the lowest transmission power to the highest group farthest from said base station having the highest transmission power;

measuring, in said base station, levels of signals received from said mobile station;

allotting said mobile station to one of said location groups corresponding to said measured signal level;

assigning an idle traffic channel to said mobile station by checking traffic channels according to the allotted location group of said mobile station;

comparing a signal level received from said base station and measured in said mobile station with the level range received and determined in said base station for determining a normal operation state in case of said signal level being within a level range, a power decrease requiring state in case of said signal level being over a maximum value of said level range, and a power increase requiring state in case of said signal level being below a minimum value of said level range;

decreasing a transmission power of said mobile station by the determination of said power decrease requiring state to allot said mobile station to a lower location group and checking traffic channels according to the location group to decrease a transmission power of said base station when there is no idle channel; and increasing a transmission power of said mobile station by the determination of said power increase requiring state to allot said mobile station to a higher location group and checking traffic channels according to the location group to increase a transmission power of said base station when there is no idle channel.

7. A transmission power control method in a cellular radiotelephone system as claimed in claim 6, further comprising the step of releasing a call upon occurrence of one of reception of a call release message from said mobile station after said normal operation state is determined and change in said transmission power.

8. The transmission power control method of claim 6, comprised of said plurality of groups comprising three location groups.

9. The transmission power control method of claim 6, comprised of said plurality of groups comprising eight location groups.

10. A method for control of power transmission in a cellular radiotelephone system having plural cell sites, each cell site having a base station and at least one mobile station, said method comprising the steps of:

forming a plurality of transmission power zones around said base station, one of said transmission power zones being closest to said base station having the lowest transmission power and another of said transmission power zones being farthest from said base station having the highest transmission power, each of said transmission power zones having a plurality of corresponding channels;

determining, over a predetermined time, a first average, said first average being an average of received signal strength indications of a signal received from said mobile station and storing said first average at said base station;

allotting said mobile station to one of said plurality of transmission power zones based upon said first average of received signal strength indications and transmitting a power control message to said mobile station for controlling said mobile station to provide a transmission power according to said allotted one of said transmission power zones;

checking for an idle channel in said allotted one of said transmission power zones and assigning said idle channel to said mobile station when said idle channel exists, and transmitting a channel assignment message to said mobile station for controlling said mobile station to operate on said idle channel;

checking for an idle channel in an adjacent transmission power zone, said adjacent transmission power zone having a transmission power higher than the transmission power of said allotted one of said transmission power zones, when said allotted one of said transmission power zones is determined not to have an idle channel, assigning said idle channel of said adjacent transmission power zone to said mobile station when said idle channel of said adjacent transmission power zone has an idle channel, and transmitting a channel assignment message to said mobile station to operate on said idle channel of said adjacent transmission power zone;

measuring, at said mobile station, a signal strength of a signal received on the assigned channel from said base station and providing to said base station received signal strength indications of said measured signal strength to said base station;

determining a second average, said second average being an average of said received signal strength indications of said measured signal strength provided by said mobile station, and storing said second average in said base station;

comparing said second average to minimum and maximum threshold values; and performing a power decreasing operation for decreasing the transmission power of said mobile station when said comparing step determines said second average to be greater than said maximum threshold value, performing a power increasing operation for increasing the transmission power of said mobile station when said comparing step determines said second average to be less than said minimum threshold value, and performing a call supervising operation after said power decreasing operation, after said power decreasing operation or when said comparing step determines said second average is not greater than said maximum threshold value and not less than said minimum threshold value.

11. The method as claimed in claim 10, further comprising the steps of:

determining whether said allotted one of said transmission power zones is said transmission power zone having said highest transmission power when said step of checking for an idle channel in said allotted one of said transmission power zones determines no idle channel exist in said allotted one of said transmission power zones; and handing a call off to an adjacent cell site when said allotted one of said transmission power zones is determined to be said transmission power zone having said highest transmission power.

12. The method as claimed in claim 10, wherein said power decreasing operation comprises the steps of:

determining whether the mobile station is currently allotted to the transmission power zone having the lowest transmission power;

handing a call off to an adjacent cell site if it is determined that the mobile station is currently allotted to the transmission power zone having the lowest transmission power;

allotting said mobile station to a neighboring transmission power zone, said neighboring transmission power zone having a transmission power less than said currently allotted transmission power zone, if it is determined that the mobile station is not currently allotted to the transmission power zone having the lowest transmission power, and transmitting a corresponding power control message to said mobile station;

checking for an idle channel in said neighboring transmission power zone and handing the call off to said neighboring transmission power zone if the neighboring transmission power zone has an idle channel;

waiting for a predetermined time, if the neighboring transmission power zone is not determined to have an idle channel, and then rechecking for an idle channel in said neighboring transmission power zone and handing the call off to said neighboring transmission power zone if the neighboring transmission power zone has an idle channel; and decreasing the transmission power of the base station when said step of checking for an idle channel in said neighboring transmission power zone has been performed a predetermined number of times.

13. The method as claimed in claim 10, wherein said power increasing operation comprises the steps of:

determining whether the mobile station is currently allotted to the transmission power zone having the highest transmission power;

handing a call off to an adjacent cell site if it is determined that the mobile station is currently allotted to the transmission power zone having the highest transmission power;

allotting said mobile station to a neighboring transmission power zone, said neighboring transmission power zone having a transmission power higher than said currently allotted transmission power zone, if it is determined that the mobile station is not currently allotted to the transmission power zone having the highest transmission power, and transmitting a corresponding power control message to said mobile station;

checking for an idle channel in said neighboring transmission power zone and handing the call off to said neighboring transmission power zone if the neighboring transmission power zone has an idle channel;

waiting for a predetermined time, if the neighboring transmission power zone is not determined to have an idle channel, and then rechecking for an idle channel in said neighboring transmission power zone and handing the call off to said neighboring transmission power zone if the neighboring transmission power zone has an idle channel; and increasing the transmission power of the base station when said step of checking for an idle channel in said neighboring transmission power zone has been performed a predetermined number of times.

14. The method as claimed in claim 10, wherein said call supervising operation comprises the steps of:

determining whether a call release message has been received from said mobile station and releasing said call if said call release message has been received; and returning to said step of measuring, at said mobile station, the signal strength of the signal received on the assigned channel if said call release message has not been received.

15. The method as claimed in claim 12, wherein said call supervising operation comprises the steps of:

determining whether a call release message has been received from said mobile station and releasing said call if said call release message has been received; and returning to said step of measuring, at said mobile station, the signal strength of the signal received on the assigned channel if said call release message has not been received.

16. The method as claimed in claim 13, wherein said call supervising operation comprises the steps of:

determining whether a call release message has been received from said mobile station and releasing said call if said call release message has been received; and returning to said step of measuring, at said mobile station, the signal strength of the signal received on the assigned channel if said call release message has not been received.

17. The method as claimed in claim 10, wherein said step of measuring further comprises the steps of:

determining, at said mobile station, a bit error rate of the signal received on the assigned channel and reporting said bit error rate to said base station; and determining a third average, said third average being an average of the reported bit error rate, and storing the third average in said base station.

18. The method as claimed in claim 17, further comprising steps of:

comparing the third average to a set maximum bit error rate value if said second average was determined not to be greater than said maximum threshold value, and performing said power decreasing operation when said third average is determined to be greater than said set maximum bit error rate value;

comparing the third average to a set minimum bit error rate values if said third average is determined not to be greater than said set maximum bit error rate value and said second average was determined not to be less than said maximum threshold value, and performing said power increasing operation when said third average is determined to be less than said set minimum bit error rate value; and performing said call supervising operation if said third average is determined not to be less than said set minimum bit error rate value.

19. The method of claim 10, comprised of said plurality of transmission power zones comprising three transmission power zones.

20. The method of claim 10, comprised of said plurality of transmission power zones comprising eight transmission power zones.

* * * * *